(12) United States Patent
Yamamoto et al.

(45) Date of Patent: Apr. 21, 2009
(10) Patent No.: US 7,521,912 B2

(54) POWER SUPPLY APPARATUS

(75) Inventors: Isao Yamamoto, Kyoto (JP); Tomoyuki Ito, Kyoto (JP)

(73) Assignee: Rohm Co., Ltd. (JP)

( * ) Notice: Subject to any disclaimer, the term of this patent is extended or adjusted under 35 U.S.C. 154(b) by 129 days.

(21) Appl. No.: 11/792,267

(22) PCT Filed: Nov. 18, 2005

(86) PCT No.: PCT/JP2005/021241

§ 371 (c)(1),
(2), (4) Date: Jun. 4, 2007

(87) PCT Pub. No.: WO2006/059500

PCT Pub. Date: Jun. 8, 2006

(65) Prior Publication Data

US 2008/0129225 A1 Jun. 5, 2008

(30) Foreign Application Priority Data

Dec. 3, 2004 (JP) .............................. 2004-350871
May 17, 2005 (JP) .............................. 2005-143522

(51) Int. Cl.
 *G05F 1/40* (2006.01)
 *G05F 1/10* (2006.01)
 *G05F 1/00* (2006.01)

(52) U.S. Cl. .................. 323/282; 323/284; 323/285; 323/274; 323/273; 327/536; 327/537; 327/535; 327/538; 315/291; 315/307; 315/247; 315/224

(58) Field of Classification Search ................ 323/222, 323/224, 226, 228, 273, 274, 266, 282, 284, 323/285, 304, 312; 327/536, 537, 535, 538, 327/540, 541, 530; 315/247, 246, 224, 225, 315/291, 307–311

See application file for complete search history.

(56) References Cited

U.S. PATENT DOCUMENTS 6,556,064 B1 4/2003 Yatabe (Continued)

FOREIGN PATENT DOCUMENTS

JP 6-78527 3/1994

(Continued)

OTHER PUBLICATIONS

Chinese Office Action for Application No. 200580041093.1; with English translation; Issuing date Jul. 4, 2008.

*Primary Examiner*—Tuyet Vo
(74) *Attorney, Agent, or Firm*—Cantor Colburn LLP

(57) ABSTRACT

In a power supply apparatus for performing constant current driving of a light emitting diode which is a load circuit, a constant current circuit is disposed on a path for driving the load circuit. A charge pump circuit which is a voltage generating circuit outputs a driving voltage to the light emitting diode. A monitoring circuit monitors the voltage across the two ends of the constant current circuit. This monitoring circuit includes a voltage source which generates a threshold voltage that follows the fluctuation of the voltage at which the constant current circuit can operate stably, compares the voltage across the two ends of the constant current circuit and the threshold voltage generated by the voltage source, and outputs a comparison result Vs to a control unit. The control unit controls the charge pump circuit on the basis of the output of the monitoring circuit.

15 Claims, 11 Drawing Sheets

U.S. PATENT DOCUMENTS

2007/0262796 A1 * 11/2007 Murakami .................. 327/109

FOREIGN PATENT DOCUMENTS

| | | |
|---|---|---|
| JP | 7-193442 | 7/1995 |
| JP | 2000-262045 | 9/2000 |
| JP | 2001-215913 | 8/2001 |
| JP | 2004-22929 | 1/2004 |
| JP | 2004-166342 | 6/2004 |
| JP | 2004-206633 | 7/2004 |
| JP | 2004-310444 | 11/2004 |

* cited by examiner

22

POWER SUPPLY APPARATUS

CROSS REFERENCE TO RELATED APPLICATIONS

This is a U.S. national stage of application No. PCT/JP2005/021241, filed on 18 Nov. 2005. Priority under 35 U.S.C. §119(a) and 35 U.S.C. §365(b) is claimed from Japanese Application No. 2004-350871, filed 3 Dec. 2004, and Japanese Application No. 2005-143522, filed 17 May 2005, the disclosures of which are also incorporated herein by reference.

BACKGROUND OF THE INVENTION

1. Field of the Invention

The present invention relates to a power supply apparatus.

2. Description of the Related Art

In small information terminals such as a mobile phone and a PDA (Personal Digital Assistance) of recent years, there are devices that require a voltage higher than the output voltage of the battery such as a light emitting diode (hereinafter also referred to as a LED) used as a back light of a liquid crystal, for example. In these small information terminals, a Li ion battery is often used, and the output voltage thereof is typically about 3.5 V, and is about 4.2 V in the fully charged state. However, the LED requires a voltage higher than the battery voltage as the driving voltage thereof. In this manner, when a voltage higher than the battery voltage is required, the battery voltage is boosted with use of a power supply apparatus of booster type using a charge pump circuit or the like, thereby to obtain a voltage needed for driving a load circuit such as a LED.

In driving the LED with such a power supply apparatus, the control of the luminescence brightness thereof is stabilized by connecting a constant current circuit on a path for driving the LED and keeping the electric current flowing through the LED to be constant (See Patent Document 1).

In order to achieve stable operation of the constant current circuit connected to the cathode terminal of the LED, the transistor constituting the constant current circuit need to operate in a constant current region. Here, the constant current region of a transistor refers to an active region in the case of a bipolar transistor, and refers to a saturation region in the case of a field effect transistor (hereinafter referred to as FET). The transistors constituting the constant current circuit is disposed in series between the cathode terminal of the LED and the grounded terminal. In order that this transistor may operate in the constant current region, the cathode terminal of the LED must be kept at a predetermined voltage or higher. Hereinafter, the voltage at which the constant current circuit can operate stably will be simply referred to as a stable operation voltage.

Here, in a power supply apparatus for driving the LED, the case of using a charge pump circuit capable of switching the boosting ratio is considered (See Patent Document 2). When the battery voltage that is input into the charge pump circuit lowers, the output voltage of the charge pump circuit, namely, the voltage at the anode terminal of the LED, also lowers. In accordance therewith, the voltage at the cathode terminal of the LED, which has been lowered by the forward voltage Vf from the voltage at the anode terminal of the LED, also lowers, so that the constant current circuit cannot be operated stably. Therefore, in this case, the constant current circuit can be stably operated by monitoring the voltage at the cathode terminal of the LED and switching the boosting ratio of the charge pump circuit so that the voltage at the cathode terminal of the LED may not become lower than the predetermined stable operation voltage.

[Patent Document 1] Japanese Patent Application Laid-Open No. 2004-22929

[Patent Document 2] Japanese Patent Application Laid-Open No. H6-78527

In the case of switching the boosting ratio of the charge pump circuit by monitoring the voltage at the cathode terminal of the LED as described above, a threshold voltage corresponding to the stable operation voltage of the constant current circuit must be set, and the voltage at the cathode terminal must be controlled to be higher than this threshold voltage.

However, since the element characteristics of the transistors and the resistors constituting the constant current circuit fluctuate due to variation of the semiconductor manufacturing processes and the temperature, the stable operation voltage of the constant current circuit also fluctuates in accordance therewith. For this reason, the threshold voltage must be set to be higher in consideration of the process variations and the temperature characteristics. For example, when the stable operation voltage of the constant current circuit fluctuates within a range of ±0.1 V at the maximum with the designed value of 0.3 V at the center, the voltage of 0.4 V or higher is set as the threshold voltage so as to ensure the margin.

Here, in the case in which this threshold voltage is set to be 0.4 V, when the stable operation voltage of the constant current circuit becomes 0.2 V due to the process variations, the voltage of the cathode terminal, which should be stabilized inherently at 0.2 V or higher, is stabilized to be 0.4 V or higher. In other words, though the boosting ratio should inherently be raised when the voltage of the cathode terminal becomes 0.2 V or lower, the boosting ratio must nevertheless be raised at the time the voltage of the cathode terminal becomes 0.4 V or lower.

Since the efficiency of the charge pump circuit becomes deteriorated according as the boosting ratio becomes higher, the efficiency of the whole circuit will be deteriorated when a margin is set at the threshold voltage for achieving stable operation of the constant current circuit as described above.

SUMMARY OF THE INVENTION

The present invention has been made in view of these problems, and a general purpose thereof is to provide a power supply apparatus which is capable of higher-efficiency operation by appropriately setting the driving voltage of a load circuit.

One embodiment of the present invention relates to a power supply apparatus. This power supply apparatus is a power supply apparatus for performing constant current driving of a load circuit and includes a constant current circuit which is disposed on a path for driving the load circuit; a voltage generating circuit which outputs a driving voltage to the load circuit; a monitoring circuit which monitors a voltage across the two ends of the constant current circuit; and a control unit which controls the driving voltage that is output from the voltage generating circuit. The monitoring circuit includes a threshold voltage source which generates a threshold voltage that follows the fluctuation of the voltage at which the constant current circuit can operate stably, and outputs to the control unit a result obtained by comparing the voltage across the two ends of the constant current circuit and the threshold voltage generated by the threshold voltage source. The control unit controls the voltage generating circuit on the basis of the output of the monitoring circuit.

According to this embodiment, when the element characteristics of the transistors and the resistors constituting the constant current circuit fluctuate due to variation of the semiconductor manufacturing processes or temperature fluctuation, and the stable operation voltage of the constant current circuit fluctuates in accordance therewith, a suitable driving voltage can be output by controlling the voltage generating circuit on the basis of the threshold voltage that follows the fluctuation.

The constant current circuit may include a current output terminal to which the load circuit to be driven is connected; an operation amplifier having a first input terminal to which a predetermined reference voltage is applied; a first transistor having a control terminal to which an output voltage of the operation amplifier is applied and having one end connected to the current output terminal; a first resistor connected to the other end of the first transistor and having one end to which a predetermined fixed voltage is applied; and a feedback path which feeds the electric potential of the connection point of the first transistor and the first resistor back to a second input terminal of the operation amplifier. The threshold voltage source may include a constant current source which outputs a predetermined constant current; a second transistor which is disposed in series on a path of the constant current that is output from the constant current source; and a second resistor having one end to which the fixed voltage is applied and having the other end to which the second transistor is connected, and may output the voltage of the connection point of the second transistor and the constant current source as the threshold voltage.

By allowing the threshold voltage source which generates the threshold voltage and the principal part of the constant current circuit to have similar constructions, when the characteristics of the first resistor and the first transistor of the constant current circuit fluctuate, the threshold voltage which is output from the threshold voltage source changes in accordance with this fluctuation, so that the voltage-generating circuit can be appropriately controlled.

The second transistor and the first transistor, and the second resistor and the first resistor may be formed respectively by pairing on a semiconductor integrated circuit.

In the voltage source which generates the threshold voltage and in the constant current circuit, when the elements corresponding to each other are formed respectively by pairing, the characteristics fluctuation of the corresponding elements can be matched, thereby enabling generation of a more appropriate threshold voltage.

The constant current that is output from the constant current source may be set within a range at which the second transistor operates in a constant current region.

The monitoring circuit may include a voltage comparator which compares the voltage across the two ends of the constant current circuit and the threshold voltage generated by the voltage source, and an offset voltage adjusting circuit which adjusts the offset voltage of the voltage comparator. In this case, by adjusting the offset voltage of the voltage comparator, an error voltage between the stable operation voltage of the constant current circuit and the threshold voltage can be cancelled.

The constant current circuit may further include a reference resistor disposed on a path of a reference current which accords with the constant current that is output from the constant current source and having one end to which the fixed voltage is applied, and the voltage appearing in the other end of the reference resistor may be applied to the first input terminal of the operation amplifier as the reference voltage. In this case, when the constant current that is output from the constant current source fluctuates, the electric current which is generated by the constant current circuit and the threshold voltage fluctuate simultaneously, so that the error can be cancelled.

The offset voltage adjusting circuit may adjust a differential current of the voltage comparator. By increasing or decreasing the differential current of the voltage comparator, the offset voltage can be shifted in both directions of the positive direction and the negative direction, so that the threshold voltage can be adjusted more accurately.

Also, the offset voltage adjusting circuit may include a main current source which generates a tail current to be supplied to a differential pair of the voltage comparator; a first variable current source which generates a first variable current and changes one of the differential currents generated by the differential pair; and a second variable current source which generates a second variable current and changes the other of the differential currents generated by the differential pair.

The main current source, and the first and second variable current sources of the offset voltage adjusting circuit may be integrally constructed to include a second constant current source and a current mirror circuit which duplicates the constant current generated by this constant current source with an adjustable mirror ratio, and the electric current duplicated by the current mirror may be output to the voltage comparator as the tail current, the first variable current, and the second variable current.

In this case, when the mirror ratio of the current mirror circuit is adjusted by trimming of the interconnection and the fuse, the ratios of the first and second variable currents to the tail current can be changed, so that the offset voltage of the voltage comparator can be suitably adjusted. Further, since the three electric currents are generated on the basis of one constant current, the relative variation can be restrained to be small.

The offset voltage adjusting circuit may include a plurality of adjusting transistors disposed in parallel to the transistors constituting the differential pair of the voltage comparator and trimmable fuses disposed on the respective electric current paths of the adjusting transistors. Also, the offset voltage adjusting circuit may include a plurality of adjusting transistors disposed in parallel to the transistors constituting the current mirror load connected to the differential pair of the voltage comparator and trimmable fuses disposed on the respective electric current paths of the adjusting transistors.

Fine adjustment of the transistor sizes of the differential pair and the current mirror load with use of the adjusting transistors can adjust the offset voltage of the voltage comparator.

The voltage generating circuit may be a charge pump circuit which switch among a plurality of boosting ratios, and the control unit may switch a boosting ratio of the charge pump circuit on the basis of a result of voltage comparison of the monitoring circuit. Also, the voltage generating circuit may be a switching regulator circuit, and the control unit may control a switching operation of the switching regulator circuit so that the voltage across the two ends of the constant current circuit and the threshold voltage will be equal to each other in the monitoring circuit.

The load circuit may be a light emitting diode; and the constant current circuit may be connected to a cathode terminal of the light emitting diode; and the monitoring circuit may monitor the voltage at the cathode terminal of the light emitting diode. In this case, the constant current driving of the light emitting diode can be efficiently performed.

Another embodiment of the present invention is a light emitting apparatus. This light emitting apparatus includes a light emitting diode and the above-described power supply apparatus for performing constant current driving of the light emitting diode. According to this embodiment, the constant current driving of the light emitting diode can be efficiently performed, so that the lifetime of the battery can be extended.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
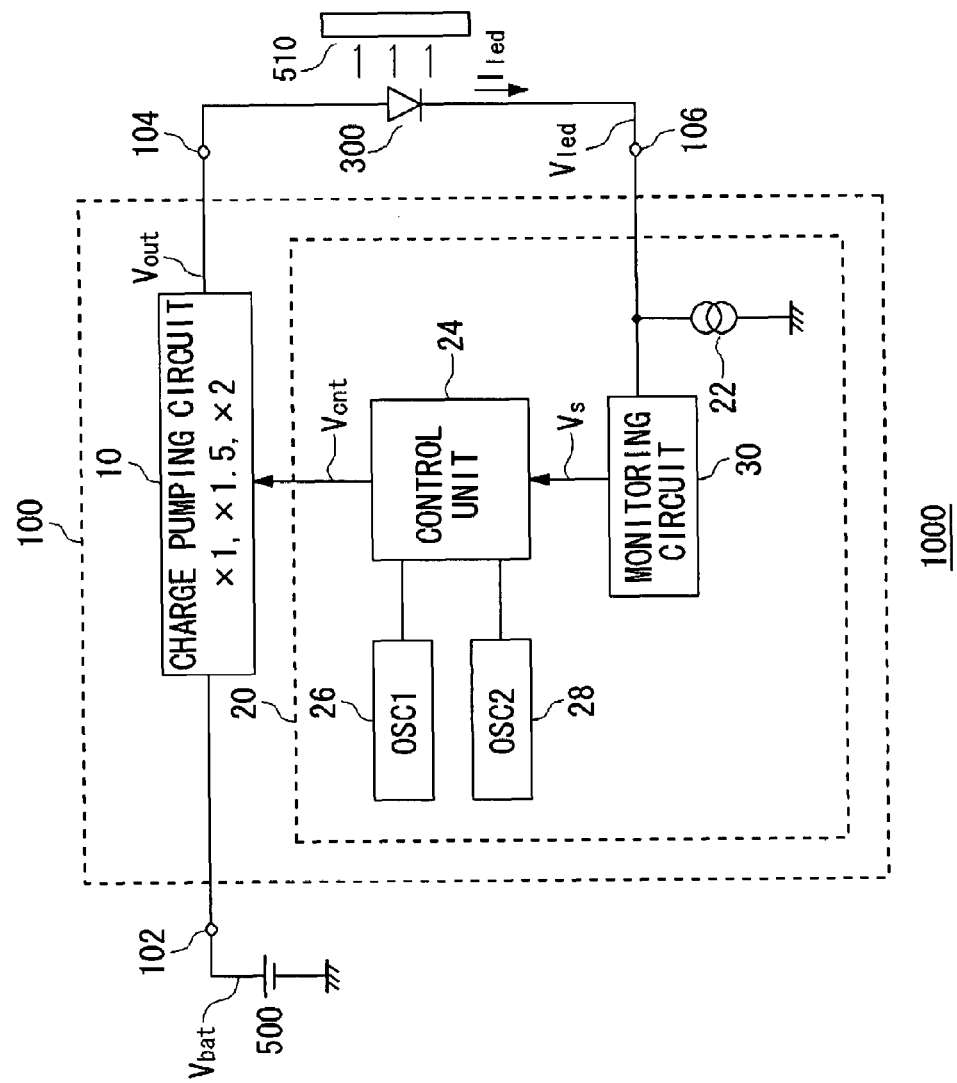
FIG. 1 is a view showing an overall construction of a power supply apparatus and a light emitting apparatus according to an embodiment.

FIG. 1 shows a light emitting apparatus 1000 according to an embodiment of the present invention. In the subsequent drawings, the same constituent elements will be denoted with the same numerals, and the description will not be repeated appropriately. The light emitting apparatus 1000 is mounted, for example, on an electronic equipment such as a mobile phone terminal or a PDA, and functions as a back light of a liquid crystal. FIG. 1 illustrates a liquid crystal panel 510 together with the light emitting apparatus 1000. A light emitting diode 300 is placed on the back surface of the liquid crystal panel 510, and functions as the back light.

This light emitting apparatus 1000 includes the light emitting diode 300 which is a light emitting element, and a power supply apparatus 100 for driving the light emitting diode 300. The light emitting apparatus 1000 is mounted on an information terminal that is driven by a battery 500, and the power supply apparatus 100 boosts the battery voltage Vbat that is output from the battery 500, so as to generate a driving voltage Vout that is needed in driving the light emitting diode.

The power supply apparatus 100 includes, as input and output terminals, an input terminal 102 into which the battery voltage Vbat is input, an output terminal 104 that is connected to the anode terminal of the light emitting diode 300 and outputs the output voltage Vout obtained by boosting the battery voltage Vbat, and a LED terminal 106 that is connected to the cathode terminal of the light emitting diode 300.

The power supply apparatus 100 includes a charge pump circuit 10 and a driving circuit 20 thereof. The charge pump circuit 10 boosts the battery voltage Vbat that is input from the input terminal 102 at a predetermined boosting ratio, and generates the output voltage Vout from the output terminal 104. This charge pump circuit 10 is constructed to be capable of switching among a plurality of boosting ratios. In the present embodiment, it is assumed that the boosting ratio can be switched among the three ways of 1, 1.5, and 2.

Figure 2:
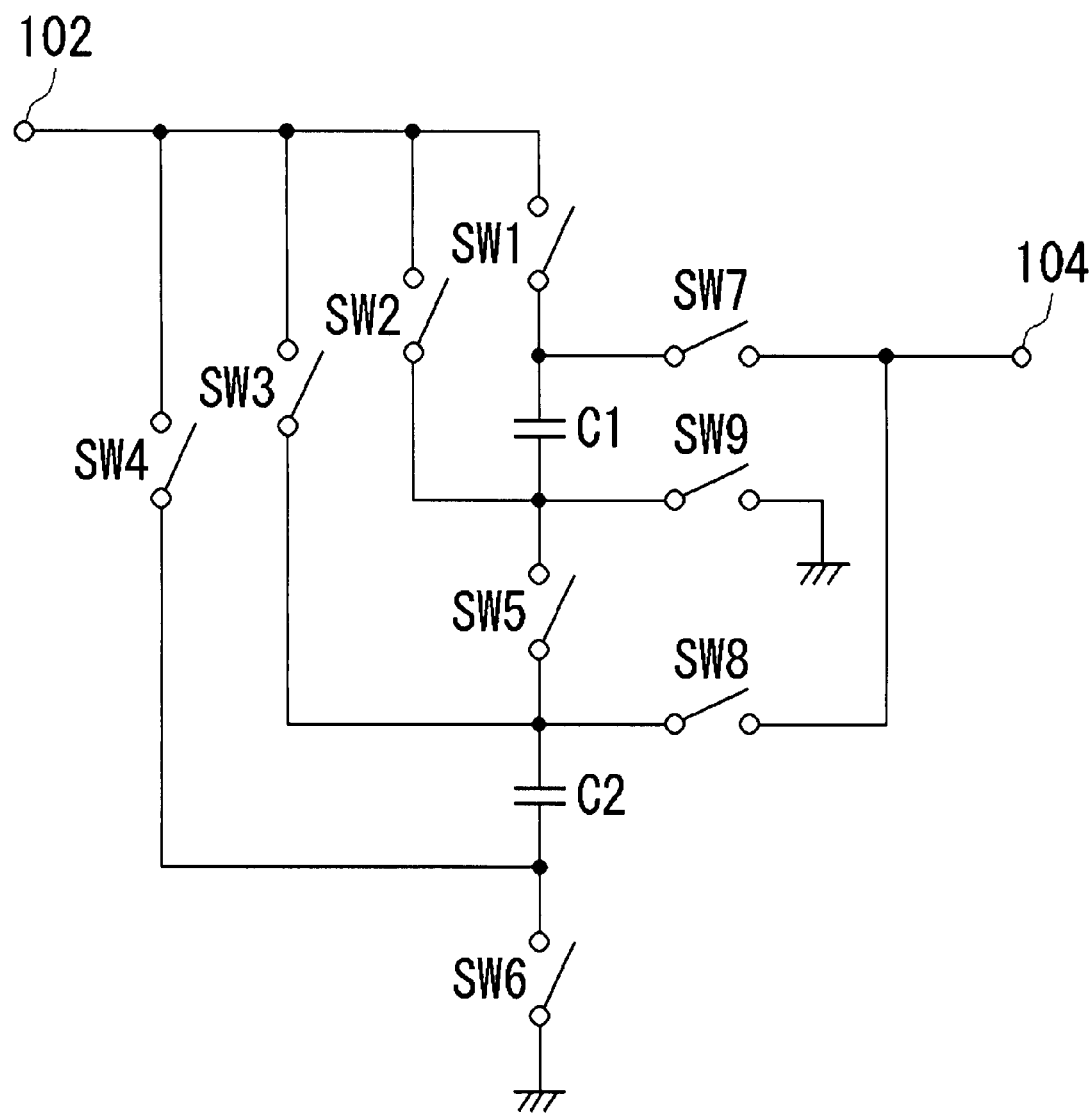
FIG. 2 is a circuit diagram showing a construction of the charge pump circuit of FIG. 1.

FIG. 2 is a circuit diagram showing a construction example of the charge pump circuit 10. The charge pump circuit 10 includes a first capacitor C1, a second capacitor C2, and a first switch SW1 to a ninth switch SW9 for controlling the connection state of these capacitors. Hereinafter, these switches will be generally called switches SW unless there is a need to distinguish these switches specifically. The first capacitor C1 and the second capacitor C2 are set to have equal capacitance values, and are externally attached to the outside of an integrated circuit.

The first switch SW1 to the ninth switch SW9 can be constructed with field effect transistors FET of N-type or P-type, and can be operated as switching elements by controlling the conduction state between the drain and the source with a voltage applied to the gate. In this charge pump circuit 10, the state of on/off of the first switch SW1 to the ninth switch SW9 is switched by a controlling signal Vcnt that is output from a driving circuit 20. Here, it is assumed that the controlling signal Vcnt is input into each of the first switch SW1 to the ninth switch SW9, though not illustrated in FIG. 2.

The charge pump circuit 10 is constructed so as to be capable of switching among a plurality of boosting ratios as described above. Here, the operation of the charge pump circuit 10 in accordance with the boosting ratios will be described.

When the boosting ratio is set to be 1, the first switch SW1, the third switch SW3, the seventh switch SW7, and the eighth switch SW8 are stationary turned on by the driving signal Vcnt that is output from the driving circuit 20, and all the other switches are turned off. As a result of this, the input terminal 102 and the output terminal 104 are brought into a conduction state by the switches that are turned on, so that the battery voltage Vbat that is applied to the input terminal 102 is output from the output terminal 104, whereby the boosting ratio will be set to be 1.

Therefore, the controlling signal Vcnt that is output from the driving circuit 20 will not be a switching signal that repeats on and off with lapse of time but will be a constant voltage when the boosting ratio is set to be 1.

Next, the operation when the boosting ratio is set to be 1.5 will be described. In the case in which the boosting ratio is larger than 1, namely, in the case of performing a boosting operation, the charge pump circuit 10 repeats a first period and a second period having different connection states of the switches.

In the first period, the first capacitor C1 and the second capacitor C2 are connected in series and are charged with the battery voltage Vbat by turning the first switch SW1, the fifth switch SW5, and the sixth switch SW6 on and turning all the other switches off. Since the capacitance values of the first capacitor C1 and the second capacitor C2 are equal, each of the two capacitors will be charged with Vbat/2 which is half of the battery voltage Vbat.

In the second period, the second switch SW2 and the seventh switch SW7, the fourth switch SW4 and the eighth switch SW8 are turned on, and all the other switches are turned off. At this time, the first capacitor C1 and the second capacitor C2 are connected in parallel between the input terminal 102 and the output terminal 104. As a result of this, a sum of the battery voltage Vbat applied to the input terminal 102 and the voltage of charging the capacitors will be output from the output terminal 104. In the first period, since the first capacitor C1 and the second capacitor C2 are charged with the voltage Vbat/2, a voltage of Vbat+Vbat/2=1.5×Vbat will be eventually output from the output terminal 104.

In this manner, the charge pump circuit 10 magnifies the battery voltage Vbat by 1.5 times for output by repeating the first period and the second period.

Next, the operation when the boosting ratio is set to be 2 will be described.

In the first period, the first switch SW1 and the ninth switch SW9, the third switch SW3 and the sixth switch SW6 are turned on, and all the other switches are turned off. The first capacitor C1 and the second capacitor C2 are connected in parallel between the input terminal 102 and the grounded terminal GND, whereby each is charged with the battery voltage Vbat.

In the second period, the second switch SW2 and the seventh switch SW7, the fourth switch SW4 and the eighth switch SW8 are turned on, and all the other switches are turned off. As a result of this, the first capacitor C1 and the second capacitor C2 are connected in parallel between the input terminal 102 and the output terminal 104. A sum of the battery voltage Vbat applied to the input terminal 102 and the voltage of charging the capacitors will be output from the output terminal 104. In the first period, since the first capacitor C1 and the second capacitor C2 are each charged with the battery voltage Vbat, a voltage of Vbat+Vbat=2×Vbat will be output from the output terminal 104.

In this manner, the charge pump circuit 10 magnifies the battery voltage Vbat by 2 times for output by repeating the first period and the second period.

Returning to FIG. 1, the driving circuit 20 sets the boosting ratio of the charge pump circuit 10, and controls the boosting operation, namely, the connection state of the switches SW of the charge pump circuit 10. This driving circuit 20 includes a constant current circuit 22, a control unit 24, a first oscillator 26, a second oscillator 28, and a monitoring circuit 30.

The constant current circuit 22 is connected to the cathode terminal of the light emitting diode 300 via a LED terminal 106. Since the luminescence brightness of the light emitting diode 300 is determined by the electric current Iled that flows through the light emitting diode 300, the constant current circuit 22 controls the electric current Iled so that the luminescence brightness of the light emitting diode 300 will be a desired value.

The monitoring circuit 30 monitors the voltage across the two ends of the constant current circuit 22 in order to switch the boosting ratio of the charge pump circuit 10. The monitoring circuit 30 compares the voltage across the two ends of the constant current circuit 22 and a predetermined threshold voltage, and outputs the result of comparison to the control unit 24. In the present embodiment, the voltage across the two ends of the constant current circuit 22 corresponds to the voltage between the grounded terminal and the LED terminal 106. Though the details will be described later, the control unit 24 switches the boosting ratio of the charge pump circuit 10 on the basis of the output Vs from the monitoring circuit 30.

Figure 3:
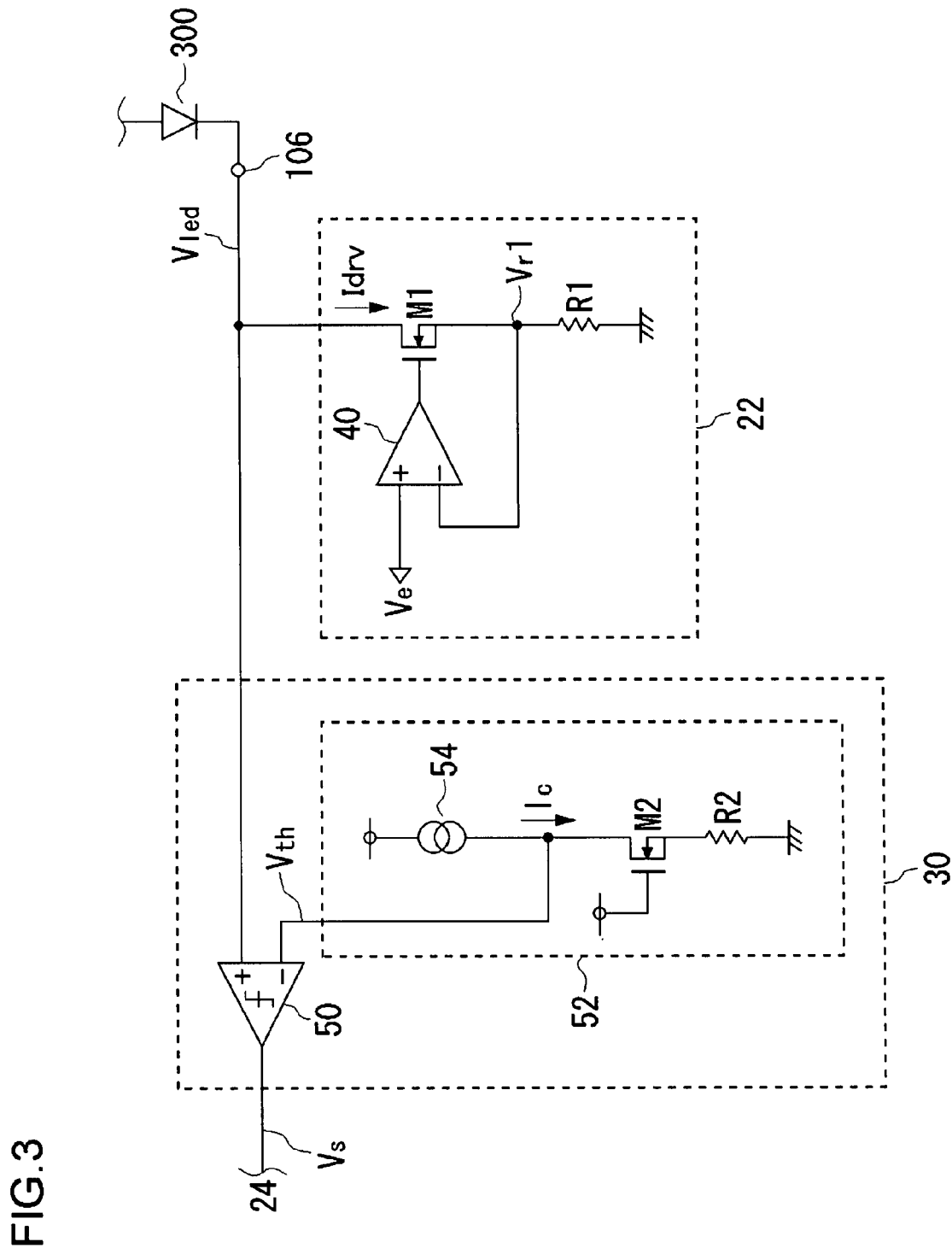
FIG. 3 is a circuit diagram showing a construction of the constant current circuit and the monitoring circuit of FIG. 1.

FIG. 3 is a circuit diagram showing a construction of the constant current circuit 22 and the monitoring circuit 30.

The constant current circuit 22 includes a first transistor M1, a first resistor R1, and an operation amplifier 40. The first transistor M1 is a MOSFET (Metal Oxide Semiconductor Field Effect Transistor) of N-type.

A predetermined reference voltage Ve is applied to the non-inverting input terminal of the operation amplifier 40. This reference voltage Ve is a voltage for controlling the luminescence brightness of the light emitting diode 300. Regarding the first transistor M1, the output voltage of the operation amplifier 40 is applied to the gate which is a control terminal, and the drain is connected to the LED terminal 106. One end of the first resistor R1 is connected to the source of the first transistor M1, and a predetermined ground voltage is applied to the other end thereof. The electric potential Vr1 at the connection point of the first transistor M1 and the first resistor R1 is fed back to the inverting input terminal of the operation amplifier 40.

The voltage Vr1 applied to the first resistor R1 is fed back to the inverting input terminal of the operation amplifier 40, and the feedback is applied so that the voltages at the inverting input terminal and at the non-inverting input terminal will be equal to each other. Therefore the voltage applied to the first resistor R1 will be approximated to the reference voltage Ve. When the voltage Vr1 applied to the first resistor R1 is equal to the reference voltage Ve, an electric current Idrv=Ve/R1 flows through the first resistor R1. This electric current Idrv is none other than the electric current Iled that flows through the light emitting diode 300 via the first transistor M1 and the LED terminal 106.

In this manner, the constant current circuit 22 generates a constant current Iled=Ve/R1 based on the reference voltage Ve, and controls the electric current Iled that flows through the light emitting diode 300.

Here, in order that this constant current circuit 22 may generate an electric current in a stable manner, the first transistor M1 must be operated in a constant current region. The constant current region means the saturation region when the transistor is a field effect transistor FET, and means an active region when the transistor is a bipolar transistor.

When the voltage Vled of the LED terminal 106 lowers, the electric potential difference between the two ends of the first transistor M1, namely the drain-source voltage, will be small, whereby the first transistor M1 will operate in a non-saturation region. In the non-saturation region, the electric current that flows between the drain and the source will be dependent on the drain-source voltage, so that the constant current circuit 22 will not operate as a constant current circuit. Therefore the luminescence brightness of the light emitting diode 300 cannot be stabilized.

For this reason, the monitoring circuit 30 monitors so that the voltage Vled of the LED terminal 106 may not become lower than a predetermined threshold voltage Vth, as shown in FIG. 3. This threshold voltage Vth is set within a range such that the first transistor M1 operates in a constant current region (saturation region), namely within a range such that the constant current circuit 22 can generate a predetermined constant electric current.

The monitoring circuit 30 includes a voltage comparator 50 and a threshold voltage source 52 that outputs the threshold voltage Vth. The voltage Vled of the LED terminal 106 and the threshold voltage Vth are input into the voltage comparator 50, whereby a high level is output when Vled>Vth holds, and a low level is output when Vled<Vth holds. The output Vs of this voltage comparator 50 is input into the control unit 24.

The control unit 24 raises the boosting ratio of the charge pump circuit 10 by one step when a state in which the voltage Vs output from the monitoring circuit 30 is at the low level, namely a state in which Vled<Vth holds, continues for a predetermined period of time. In other words, when the voltage Vs output from the monitoring circuit 30 becomes the low level while the operation is carried out at a boosting ratio of 1, the control unit 24 sets the boosting ratio to be 1.5. Similarly, when the voltage Vs output from the monitoring circuit 30 becomes the low level while the operation is carried out at boosting ratio of 1.5, the control unit 24 sets the boosting ratio to be 2.

As a result of this, even in the case in which the battery voltage Vbat lowers due to the discharging of the battery 500 and the voltage Vled at the cathode terminal of the light emitting diode 300 lowers in accordance therewith, the boosting ratio can be appropriately switched. When the boosting ratio is set to be high, the output voltage Vout that is output from the output terminal 104 rises, so that the voltage Vled at the LED terminal 106 can be made higher than the threshold voltage Vth, whereby the constant current circuit 22 can be stably operated.

The threshold voltage Vth that is output from the threshold voltage source 52 is set to be a stable operation voltage of the constant current circuit 22, namely, within a range such that the first transistor M1 operates in a constant current region (saturation region). For example, this threshold voltage Vth is set to be 0.3 V.

Figure 4:
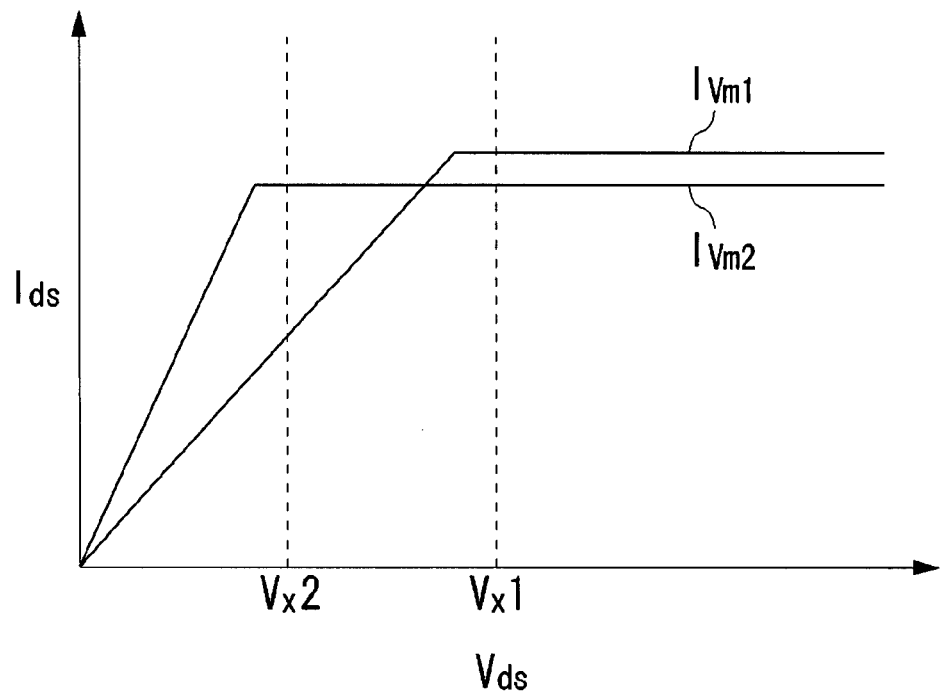
FIG. 4 is a view showing the current voltage characteristics of the FET which is the first transistor.

Here, the element characteristics and the circuit characteristics of the first transistor M1, the first resistor R1, and the operation amplifier 40 constituting the constant current circuit 22 fluctuate in accordance with the variation of the semiconductor manufacturing process or the temperature. FIG. 4 is a view showing the current voltage characteristics (IV characteristics) of the FET which is the first transistor M1, where the longitudinal axis represents the drain-source current Ids, and the lateral axis represents the drain-source voltage Vds.

In the drawing, with an average current voltage characteristics IVm1, it is a saturation region when the drain-source voltage is higher than the voltage Vx1, and it is a non-saturation region when the drain-source voltage is lower than the voltage Vx1. Now, assuming that the current voltage characteristics change to the current voltage characteristics IVm2 due to the variation of the semiconductor manufacturing process or the temperature change, the boundary voltage of the saturation region and the non-saturation region will also be shifted to Vx2 in accordance therewith.

The voltage across the two ends of the constant current circuit 22 will be a sum of the voltage drop Vr1 by the first resistor R1 and the drain-source voltage of the first transistor M1. Therefore, in accordance with the fluctuation of the current voltage characteristics of the first transistor M1, the stable operation voltage of the constant current circuit 22 will also change. Similarly, this stable operation voltage will also change in accordance with the variation of the resistance value of the first resistor R1.

Assuming that the current voltage characteristics of the first transistor M1 fluctuate between IVm1 and IVm2 of FIG. 4 due to the variation of the semiconductor manufacturing process or the temperature change, the voltage for stably operating the constant current circuit 22 will fluctuate within a range from Vth1=Ic×R1+Vx1 to Vth2=Ic×R1+Vx2.

In the case in which the threshold voltage Vth generated by the threshold voltage source 52 of the monitoring circuit 30 is a constant value, the threshold voltage Vth must be set to be Vth1=Ic×R1+Vx1 in consideration of the margin in order to operate the constant current circuit 22 stably in all of the ranges in which the current voltage characteristics of the first transistor M1 fluctuate.

Figure 5:
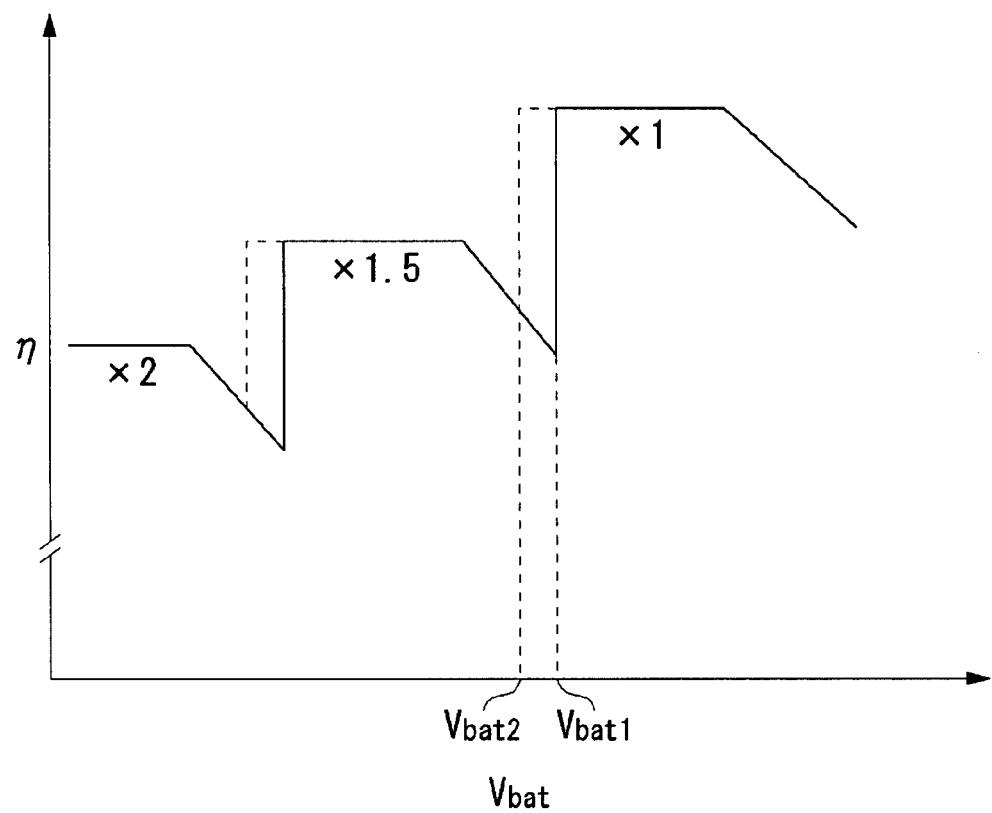
FIG. 5 is a view showing a relationship between the battery voltage which will be the input voltage of the charge pump circuit and the efficiency η.

Here, the efficiency of the charge pump circuit 10 will be studied. FIG. 5 is a view showing the battery voltage Vbat which will be the input voltage of the charge pump circuit 10 and the efficiency η.

Here, a case in which the threshold voltage Vth generated by the threshold voltage source 52 is fixed to a certain voltage Vth1 will be considered. When the boosting ratio is 1, the relationship between the battery voltage Vbat and the voltage Vled at the LED terminal 106 is represented by Vbat=Vled+ Vf using the forward voltage Vf of the light emitting diode 300. Now, when the relationship Vbat<Vbat1 (=Vth1+Vf) is satisfied in accordance with the decrease in the battery voltage Vbat, the voltage Vled at the LED terminal 106 will be <Vth1, so that the boosting ratio will be switched from 1 to 1.5.

In this manner, when the threshold voltage Vth is fixed to a certain voltage Vth1, even in a case in which the characteristics of the first transistor M1 vary and the stable operation voltage of the constant current circuit 22 becomes lower than the certain voltage Vth1, the boosting ratio will be switched to 1.5 in a state in which Vbat<Vbat1 holds, thereby leaving room for improvement in view of the efficiency.

Therefore, in order to improve the efficiency of the charge pump circuit 10, the threshold voltage source 52 of the monitoring circuit 30 according to the present embodiment is constructed to generate a threshold voltage Vth that follows the fluctuation in the characteristics of the first transistor M1 and the first resistor R1.

Returning to FIG. 3, the threshold voltage source 52 includes a second transistor M2, a second resistor R2, and an electric current source 54.

The second transistor M2, the second resistor R2, and the electric current source 54 are connected in series, and a constant voltage Ic generated by the electric current source 54 is allowed to flow through the second transistor M2 and the second resistor R2. The power supply voltage Vdd is applied to the gate of the second transistor M2.

This threshold voltage source 52 outputs the voltage at the connection point of the second transistor M2 and the electric current source 54 as the threshold voltage Vth. The drain-source voltage Vds2 of the second transistor M2 is determined by the constant current Ic, and the voltage Vr2 appearing in the second resistor R2 is given by Vr2=Ic×R2. As a result of this, the threshold voltage Vth can be represented as Vth=Ic×R2+Vds2.

In this manner, in the threshold voltage source 52, the construction of the principal part for generating the threshold voltage Vth is approximately the same as that of the constant current circuit 22. On a semiconductor integrated circuit, the first resistor R1 and the second resistor R2 are preferably formed to be close to each other by being paired. Similarly, the first transistor M1 and the second transistor M2 are preferably formed to be close to each other so as to be paired.

In this manner, by forming the principal constructions of the constant current circuit 22 and the threshold voltage source 52 to be the same and forming the resistors and the transistors constituting the circuits by pairing, the amount of fluctuation of the characteristics of the corresponding elements can be made to be approximately equal to each other.

As a result of this, in the case in which the current voltage characteristics of the first transistor M1 fluctuate and the boundary voltage Vx between the saturation region and the non-saturation region of the first transistor M1 fluctuates, the boundary voltage Vx between the saturation region and the non-saturation region of the second transistor M2 will also fluctuate, so that the threshold voltage Vth can be changed to follow the fluctuation in the characteristics of the first transistor M1.

Similarly, in the case in which the resistance value of the first resistor R1 fluctuates due to the variation of the semiconductor manufacturing process or the temperature change, the resistance value of the second resistor R2 will also fluctuate in a similar manner, so that the threshold voltage Vth will also follow the fluctuation in the characteristics of the second resistor R2.

By constructing the monitoring circuit 30 as described above, even if the stable operation voltage of the constant current circuit 22 fluctuates due to the fluctuation of the element characteristics caused by the process variation or the temperature change, the threshold voltage Vth is generated in accordance with the fluctuation, so that an optimum setting of the boosting ratio can be made in the control unit 24.

As a result of this, it means that the voltage for switching the boosting ratio can be appropriately set within a range from Vbat1 to Vbat2 as shown in FIG. 5, so that the efficiency of the charge pump circuit 10 can be improved. Similarly, the switching of the boosting ratio from 1.5 to 2 is performed with an optimum voltage, so that the efficiency can be improved.

Figure 6:
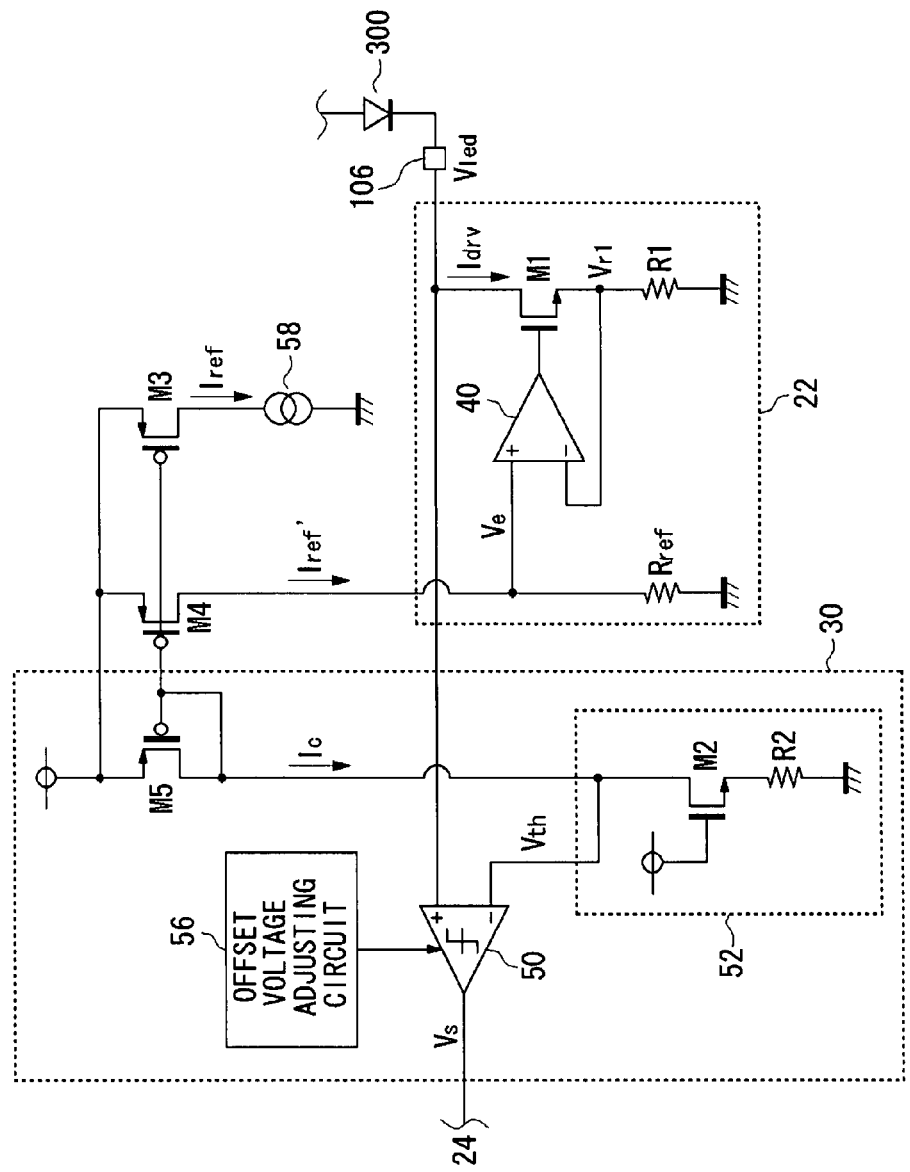
FIG. 6 is a circuit diagram showing a construction of the monitoring circuit and the constant current circuit.

Next, a technique of performing a further optimum setting of the boosting ratio with use of the monitoring circuit 30 will be described. FIG. 6 is a circuit diagram showing a construction of the monitoring circuit 30 and the constant current circuit 22. The monitoring circuit 30 of FIG. 6 is provided with an offset voltage adjusting circuit 56.

The voltage comparator 50 compares the voltage Vled at the LED terminal 106 which is the voltage across the two ends of the constant current circuit 22 and the threshold voltage Vth generated by the threshold voltage source 52. The offset voltage adjusting circuit 56 adjusts the offset voltage ΔV of the voltage comparator 50.

The constant current source 58, the transistor M3, and the transistor M5 of FIG. 6 correspond to the electric current source 54 of FIG. 3. The constant current source 58 generates a reference current Iref. The transistors M3, M5 constitute a current mirror circuit, and a constant current Ic proportional to the reference current Iref is output to the threshold voltage source 52. Also, since the transistors M3, M4, M5 constitute a current mirror circuit, the reference current Iref' that is input into the constant current circuit 22 is an electric current which corresponds to the constant current Ic that is output to the threshold voltage source 52. In the constant current circuit 22, the reference voltage Ve that is applied to the non-inverting input terminal of the operation amplifier 40 is generated by allowing the reference current Iref' to flow through the reference resistor Rref. Namely, the reference voltage Ve is given by Ve=Iref'×Rref, and the driving current Idrv will be Idrv=Iref'×Rref/R1 and is proportional to the reference current Iref'. The reference resistor Rref is also preferably formed by being paired with the first resistor R1 and the second resistor R2.

When the value of the reference current Iref fluctuates due to the process variation or the temperature change and the value of the driving current Idrv fluctuates, the saturation drain-source voltage of the first transistor M1, namely the stable operation voltage of the constant current circuit 22, fluctuates. In the monitoring circuit 30 of FIG. 6, the threshold voltage Vth generated by the threshold voltage source 52 and the driving current Idrv generated by the constant current circuit 22 are both set on the basis of the reference current Iref generated by the constant current source 58. Therefore, when the reference current Iref fluctuates and the stable operation voltage of the constant current circuit 22 fluctuates, the threshold voltage Vth will also fluctuate in accordance therewith. At this time, the voltage that is input into the voltage comparator 50 will be shifted in the same direction, so that the process variation can be cancelled.

Figure 7:
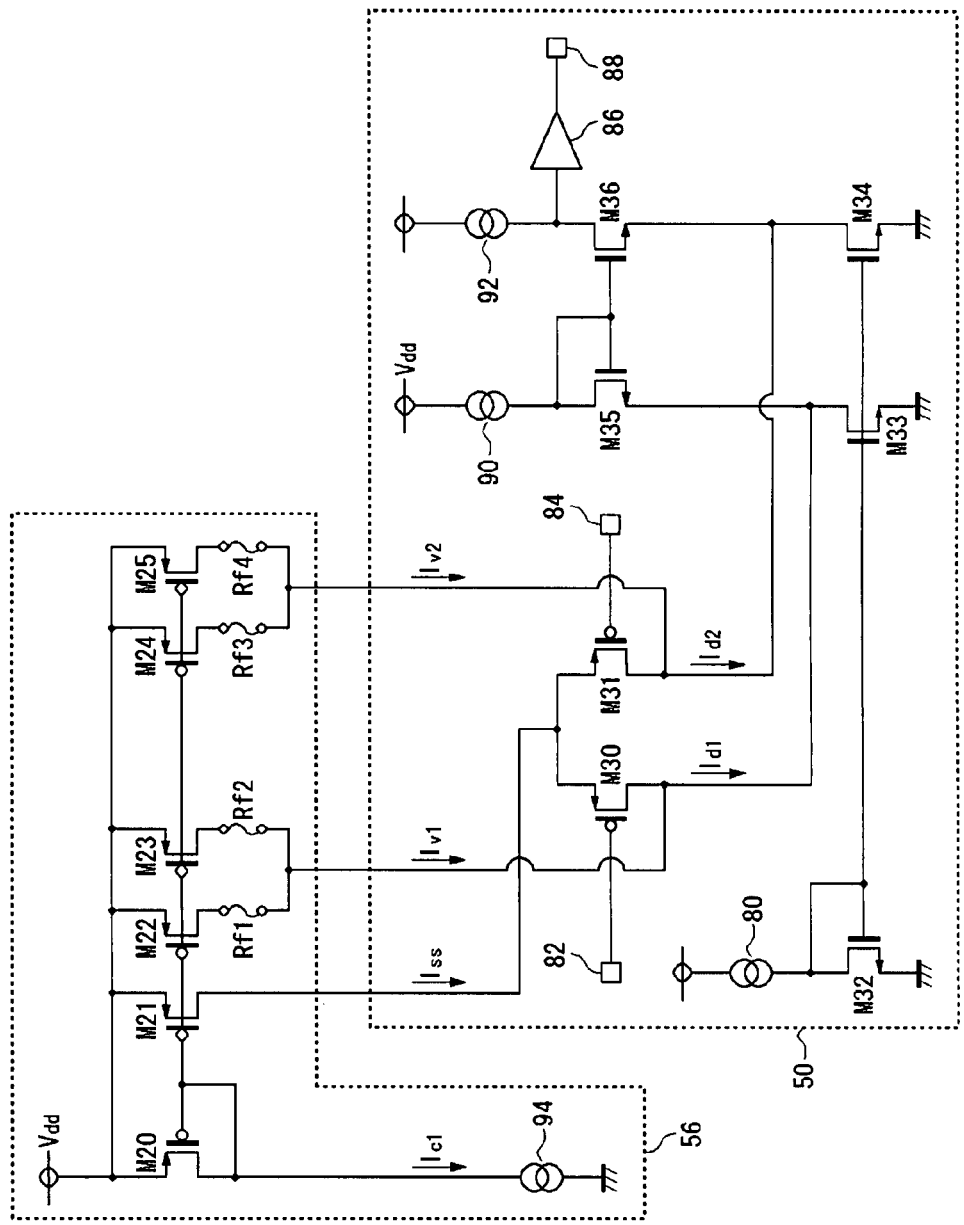
FIG. 7 is a circuit diagram showing a construction of a voltage comparator and an offset voltage adjusting circuit.

FIG. 7 is a circuit diagram showing a construction of the voltage comparator 50 and the offset voltage adjusting circuit 56. The voltage comparator 50 includes transistors M30 to M36, constant current sources 80, 90, 92, and an amplifying stage 86. The transistors M30, M31 constitute an input differential pair, and the respective gates 82, 84 correspond to the two input terminals of the voltage comparator 50. The drains of the transistors M30, M31 are connected to the current mirror load including the transistors M33, M34 provided as a constant-current load. The transistors M33, M34 are a current mirror circuit in which the gates and the sources thereof are connected in common to those of the transistors M32, and a constant electric current generated by the constant current source 80 flows through each transistor.

The drains of the transistors M33, M34 are connected respectively to the sources of the transistors M35, M36. The gates of the transistors M35, M36 are connected in common, and the gate and the drain of the transistor M35 are connected. Constant-current sources 90, 92 are connected respectively to the drains of the transistors M35, M36. The drain of the transistor M36 is connected to an amplifying stage 86. The drain current of the transistor M36 will be a differential current obtained by differential amplification of the gate voltages of the transistors M30, M31. The amplifying stage 86 amplifies the difference between the electric current generated by the constant current source 92 and the drain current of the transistor M36, and outputs it from the output terminal 44 of the voltage comparator 50. Here, the construction of the voltage comparator 50 shown in FIG. 7 is one example, so that voltage comparators of various other circuit forms can be used.

The offset voltage adjusting circuit 56 adjusts the offset voltage ΔV by adjusting the differential current of the voltage comparator 50. The offset voltage adjusting circuit 56 includes transistors M20 to M25, fuses Rf1 to Rf4, and a constant current source 94.

The transistor M21 functions as a main current source which generates a tail current Iss which will be supplied to the input differential pair (transistors M30, M31) of the voltage comparator 50. Also, the transistors M22, M23 and the fuses Rf1, Rf2 generate a first variable current Iv1 and functions as a first variable current source that increases one differential current Id1 that is generated by the differential pair (M30, M31). Also, the transistors M24, M25 and the fuses Rf3, Rf4 generate a second variable current Iv2 and functions as a second variable current source that increases one differential current Id2 that is generated by the differential pair (M30, M31).

The constant current source 94 generates a constant electric current Ic1. The transistors M20 to M25 constitute a current mirror circuit in which the gates and the sources are connected in common, and duplicates the constant current Ic1 in accordance with a mirror ratio that corresponds to the size ratio of each transistor to generate the tail current Iss, the first variable current Iv1, and the second variable current Iv2. The electric current value of the first variable current Iv1 is made variable by a cut state of the fuses Rf1, Rf2. The electric current value of the second variable current Iv2 also changes similarly in accordance with a cut state of the fuses Rf3, Rf4. For example, when the size ratio of the transistors M21, M22, M23 is set to be 100:2:1, the first variable current Iv1 can be adjusted within a range of 3%, 2%, 1%, and 0% relative to the tail current Iss. The same applies to the transistors M24, M25 as well.

The first variable current Iv1 is supplied to one transistor M30 side of the input differential pair of the voltage comparator 50, and the second variable current Iv2 is supplied to the other transistor M31 side of the differential pair. According to the offset voltage adjusting circuit 56 of FIG. 7, the differential current of the voltage comparator 50 can be adjusted by the cut state of the fuses Rf1 to Rf4. When the differential current of the operation amplifier is adjusted, the voltage-current characteristics of the input differential pair will be shifted, so that the offset voltage $\Delta V$ can be adjusted.

Returning to FIG. 6, generally the resistance value and the transistor characteristics of a semiconductor integrated circuit vary in accordance with a semiconductor manufacturing process, and the magnitude of this variation is varied in accordance with the layout of each element, the kind of the semiconductor manufacturing process, and others. For this reason, the mirror ratio of the transistors M4, M5 that constitute the current mirror circuit also has a variation dependent on the semiconductor manufacturing process.

For example, it is assumed that the values of the reference current Iref' and the constant current Ic vary relatively within a range of about ±2%. This variation will be an error of the threshold voltage Vth generated by the threshold voltage source 52 and the stable operation voltage of the constant current circuit 22. When the threshold voltage Vth deviates from the optimum value, it is not desirable because it will invite deterioration in the efficiency of the power supply apparatus 100 as described above.

Therefore, by trimming the fuses Rf1 to Rf4 in the offset voltage adjusting circuit 56 shown in FIGS. 6 and 7, the offset voltage $\Delta V$ of the voltage comparator 50 is shifted in the direction of canceling the variation of the mirror ratio of the transistors M4, M5. As described above, the first variable current Iv1 and the second variable current Iv2 can be adjusted within a range of 0%, 1%, 2%, and 3% relative to the tail current Iss of the differential pair. Also, the sign (positive or negative) of the offset voltage $\Delta V$ will be reversed between the case in which the fuses Rf1, Rf2 are trimmed and the case in which the fuses Rf3, Rf4 are trimmed.

By changing the offset voltage $\Delta V$ of the voltage comparator 50, the fluctuation of the stable operation voltage of the constant current circuit 22 caused by the process variation can be cancelled, whereby the deterioration in the efficiency of the power supply apparatus 100 can be restrained.

In other words, in the offset voltage adjusting circuit 56, the size ratio of the transistors M21 to M25 that generate the tail current Iss, the first variable current Iv1, and the second variable current Iv2 may be set so as to be capable of sufficiently reducing the error between the threshold voltage Vth and the voltage needed for stable operation of the constant current circuit 22.

Figure 8:
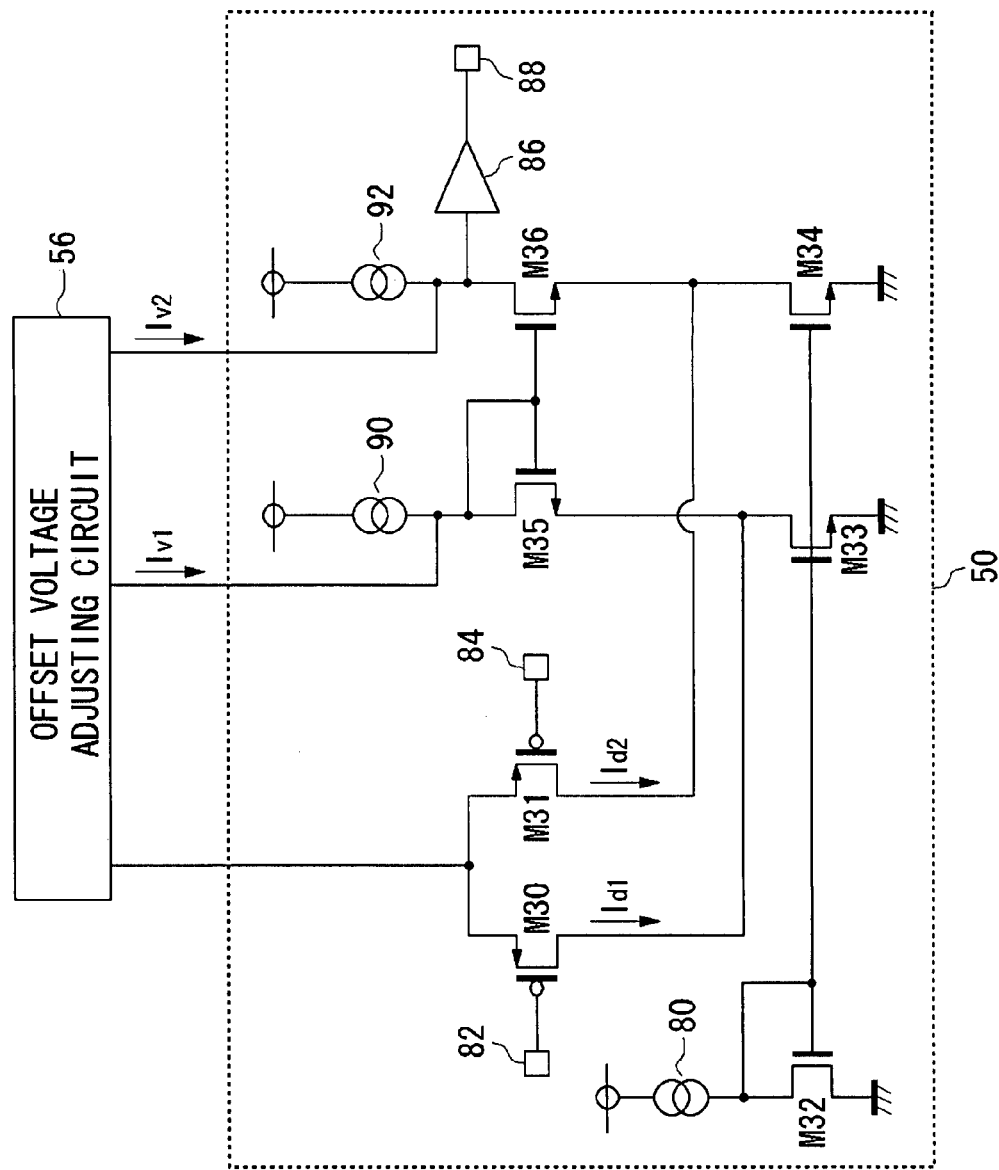
FIG. 8 is a circuit diagram showing a modified example of the voltage comparator and the offset voltage adjusting circuit of FIG. 7.

FIG. 8 is a circuit diagram showing a modified example of the voltage comparator 50 and the offset voltage adjusting circuit 56 of FIG. 7.

In FIG. 7, the first variable current Iv1 is supplied to one transistor M30 side of the differential pair, and the second variable current Iv2 is supplied to the other transistor M31 side of the differential pair. In contrast, in FIG. 8, the first variable current Iv1 is supplied to one transistor M35 side of the current mirror load (M35, M36) connected to the differential pair (M30, M31), and the second variable current Iv2 is supplied to the other transistor M36 side of the current mirror load. In the case in which the differential current is adjusted in this manner, the offset voltage $\Delta V$ of the voltage comparator 50 can be adjusted as well, and an effect similar to that of FIG. 7 can be obtained. The same applies to the case in which the first variable current Iv1 and the second variable current Iv2 are supplied to other positions capable of adjusting the differential current.

Figure 9:
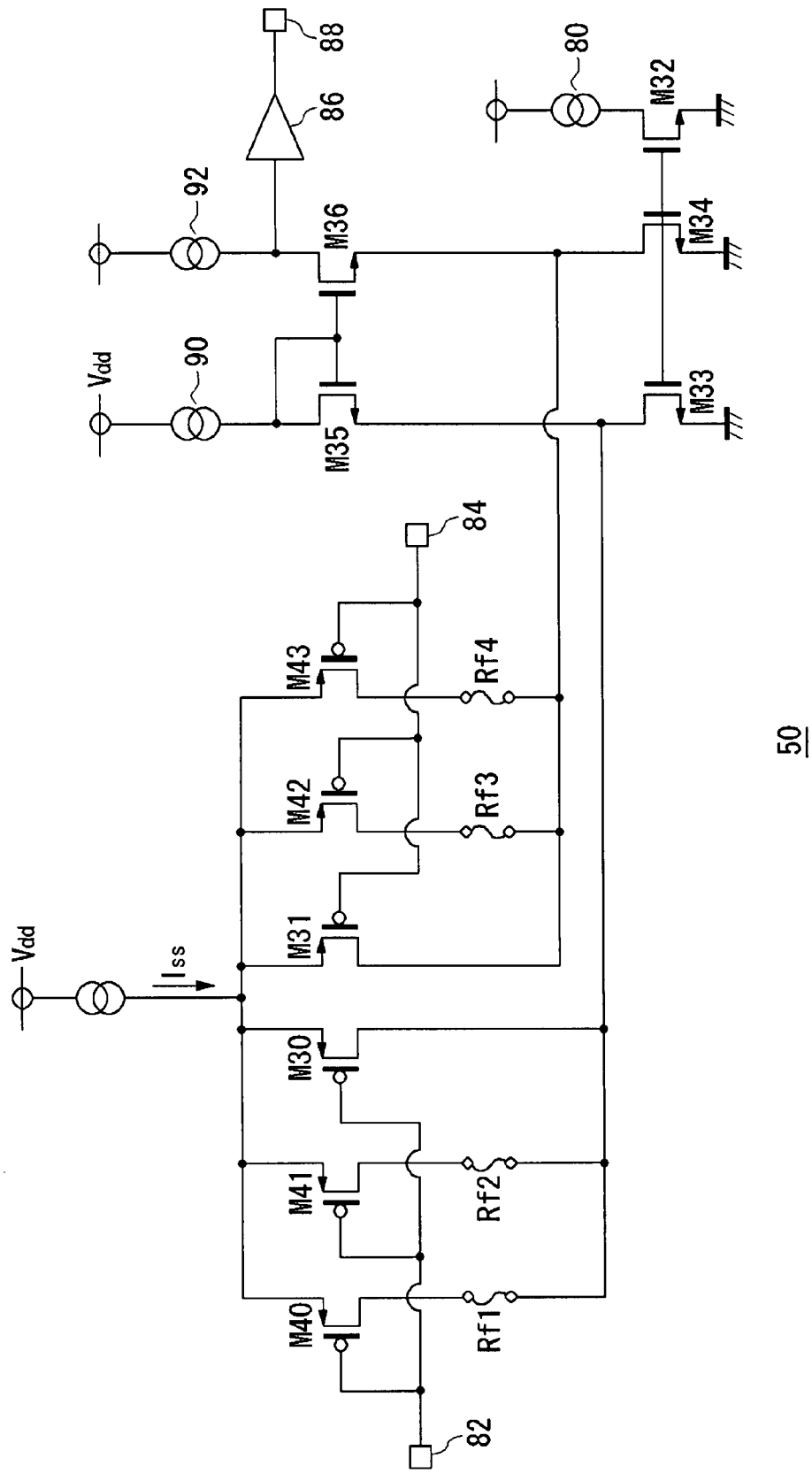
FIG. 9 is a circuit diagram showing a construction of a voltage comparator whose offset voltage can be adjusted.

The offset voltage $\Delta V$ of the voltage comparator 50 can also be adjusted by the circuit shown in FIG. 9. FIG. 9 is a circuit diagram showing a construction of the voltage comparator 50 whose offset voltage can be adjusted. This voltage comparator 50 is constructed integrally with the offset voltage adjusting circuit 56. In the present embodiment, the offset voltage adjusting circuit includes transistors M40 to M43 for adjustment and fuses Rf1 to Rf4.

The transistors M40 to M43 for adjustment are disposed in parallel with the transistors M30, M31 constituting the differential pair of the voltage comparator 50. Trimmable fuses Rf1 to Rf4 are disposed on an electric current path of the transistors M40 to M43 which are transistors for adjustment.

According to the voltage comparator 50 of FIG. 9, the size of the transistors constituting the differential pair of the voltage comparator 50 can be changed substantially by the trimming state of the fuses Rf1 to Rf4. As a result of this, the differential current is adjusted, and the offset voltage $\Delta V$ can be shifted.

Also, though the size of the transistors of the differential pair is adjusted in FIG. 9, the size of the transistors M33, M34 constituting the current mirror load may be adjusted as a modified example. Namely, a plurality of transistors for adjustment are disposed in parallel with the transistors M33, M34, and a trimmable fuse is disposed on an electric current path of each transistor of these transistors for adjustment. By constructing an offset voltage adjusting circuit 56 with the transistors for adjustment and the fuses and trimming the fuses, the differential current can be adjusted, and the offset voltage $\Delta V$ can be adjusted.

Similarly, the size of the transistors M35, M36 may be adjusted in place of the transistors M33, M34.

Returning to FIG. 1, the control unit 24 sets the boosting ratio of the charge pump circuit 10, and generates a controlling signal Vcnt in accordance with the set boosting ratio. This control unit 24 monitors the output signal Vs of the monitoring circuit 30, and raises the boosting ratio when a state in which the output signal Vs is at a low level continues for a predetermined period of time. In the present embodiment, the control unit 24 raises the boosting ratio of the charge pump circuit 10 by one step when the output signal Vs of the monitoring circuit 30 continues to be at a low level for 2 ms.

The periodic signal needed for the control unit 24 to generate the controlling signal Vcnt and to perform the measurement of time is output from a first oscillator 26 and a second oscillator 28. The first oscillator 26 and the second oscillator 28 are each provided with an enabling terminal not illustrated in the drawings, and are constructed to be capable of stopping the operation.

When the control unit 24 performs the boosting operation with the charge pump circuit 10, namely, when the boosting ratio is set to be 1.5 or 2, the controlling signal Vcnt will be a switching signal that turns the first switch SW1 to the ninth switch SW9 on and off. The first oscillator 26 generates a first periodic signal Vosc1 having a frequency needed for this switching signal. For example, the frequency of this first periodic signal Vosc1 is set to be 1 MHz.

Also, the control unit 24 generates a second periodic signal Vosc2 having a frequency needed for measuring the time 2 ms in monitoring the output signal Vs of the monitoring circuit 30. Since the time of about 2 ms can be measured with use of a frequency of about several ten kHz, it is assumed in the present embodiment that this second periodic signal Vosc2 is set to have a frequency of 64 kHz.

The driving circuit 20 uses either one of the first oscillator 26 and the second oscillator 28 by switching in accordance with the boosting ratio of the charge pump circuit 10. For this reason, the control unit 24 outputs an enabling signal that controls the on-off on the enabling terminals of the first oscillator 26 and the second oscillator 28 in accordance with the boosting ratio of the charge pump circuit 10.

Hereinafter, the operation in switching the boosting ratio of the charge pump circuit 10 in the driving circuit 20 will be described.

When the battery voltage Vbat output from the battery 500 is sufficiently high, the boosting ratio is set to be 1. Now, when the battery voltage Vbat lowers due to electric power consumption, the voltage Vled of the LED terminal 106 also lowers. In the monitoring circuit 30, the threshold voltage Vth output from the threshold voltage source 52 and the voltage Vled of the LED terminal 106 are compared and, when Vled<Vth holds, the monitoring circuit 30 outputs a low level as an output signal Vs.

When the boosting ratio of the charge pump circuit 10 is set to be 1, it is sufficient to stationarily turn the first switch SW1, the third switch SW3, the seventh switch SW7, and the eighth switch SW8 on in the charge pump circuit 10, so that the first periodic signal Vosc1 having a frequency of 1 MHz is not needed. For this reason, when the boosting ratio is 1, the control unit 24 turns the first oscillator 26 off and allows only the second oscillator 28 to operate, thereby to perform measurement of time by using the second periodic signal Vosc2.

When the output signal Vs of the monitoring circuit 30 continues to be at the low level for 2 ms, the control unit 24 switches the boosting ratio to 1.5. When the boosting ratio is higher than 1, a switching signal that repeats on and off must be generated as a controlling signal Vcnt to be output to the charge pump circuit 10 as described above. At this time, the control unit 24 needs the first periodic signal Vosc1, and hence turns the first oscillator 26 on. When the boosting ratio is 1.5, the control unit 24 performs measurement of time for monitoring the state of the output signal Vs of the monitoring circuit 30 by using the first periodic signal Vosc1. At this time, since the second periodic signal Vosc2 is not needed, the control unit 24 turns the second oscillator 28 off.

Further, also when the battery voltage Vbat lowers and the boosting ratio is set to be 2, the control unit 24 turns only the first oscillator 26 on, and performs generation of the controlling signal Vcnt and measurement of time of 2 ms on the basis of the first periodic signal Vosc1.

The consumption current of an oscillator is dependent on the frequency. The higher the frequency is, the larger the consumption current will be. In other words, the consumption current of the first oscillator 26 is larger than the consumption current of the second oscillator 28. For this reason, with the driving circuit 20 according to the present embodiment, in the case of performing the boosting operation, the first oscillator 26 that oscillates at 1 MHz is turned on, so as to generate the controlling signal Vcnt and to perform measurement of time for setting the boosting ratio. On the other hand, when the boosting ratio is 1, there is no need to generate a signal having a high frequency as the controlling signal Vcnt, so that, by switching to the second oscillator 28 having a smaller consumption current, the consumption current of the circuit can be reduced, thereby achieving a higher efficiency.

As shown above, the construction and the operation of the power supply apparatus 100 according to the present embodiment have been described. With the power supply apparatus 100 according to the present embodiment, even if the stable operation voltage of the constant current circuit 22 fluctuates due to fluctuation of the element characteristics caused by process variation or temperature change, the threshold voltage Vth is generated in accordance with the fluctuation, so that an optimum boosting ratio can be set in the control unit 24 and an appropriate output voltage Vout can be generated.

The above-described embodiment is an exemplification, and it will be understood by those skilled in the art that various modified examples can be made in the combination of the constituent elements and the treating processes thereof, and that those modified examples are also within the scope of the present invention.

Figure 10:
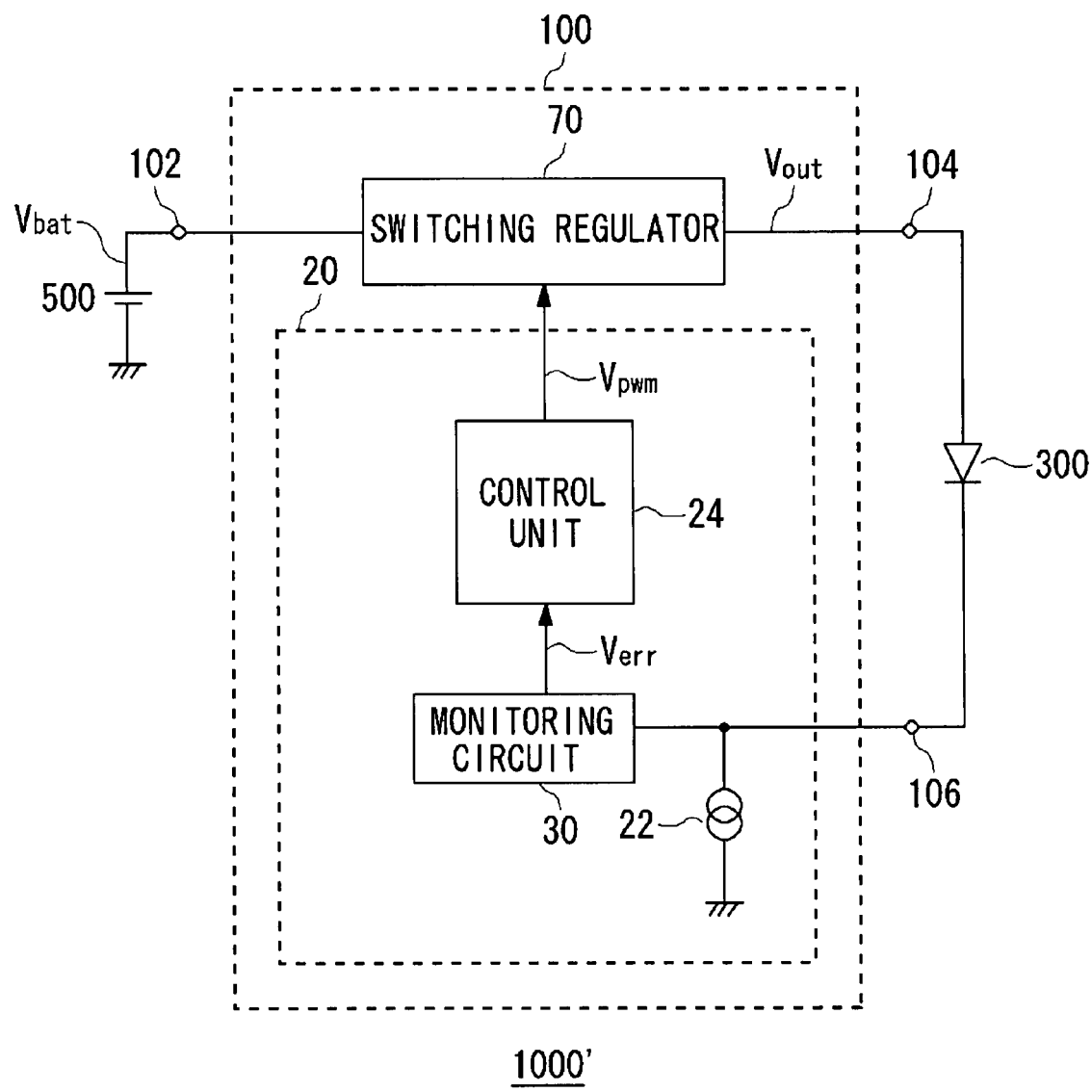
FIG. 10 is a view showing a modified example of the power supply apparatus of FIG. 1.

FIG. 10 is a view showing a modified example of the power supply apparatus 100. In the power supply apparatus 100 of FIG. 10, a switching regulator 70 is used instead of the charge pump circuit 10 as a voltage generating circuit. This switching regulator 70 is a voltage generating circuit that performs energy conversion between an inductor and a capacitor by on and off of a switching element, so as to raise the input voltage.

From the control unit 24, a switching signal Vpwm subjected to pulse width modulation (hereinafter referred to as PWM) is output, and the on-off of the switching element of the switching regulator 70 is controlled by this switching signal, whereby the output voltage Vout is stabilized to a desired voltage value.

Figure 11:
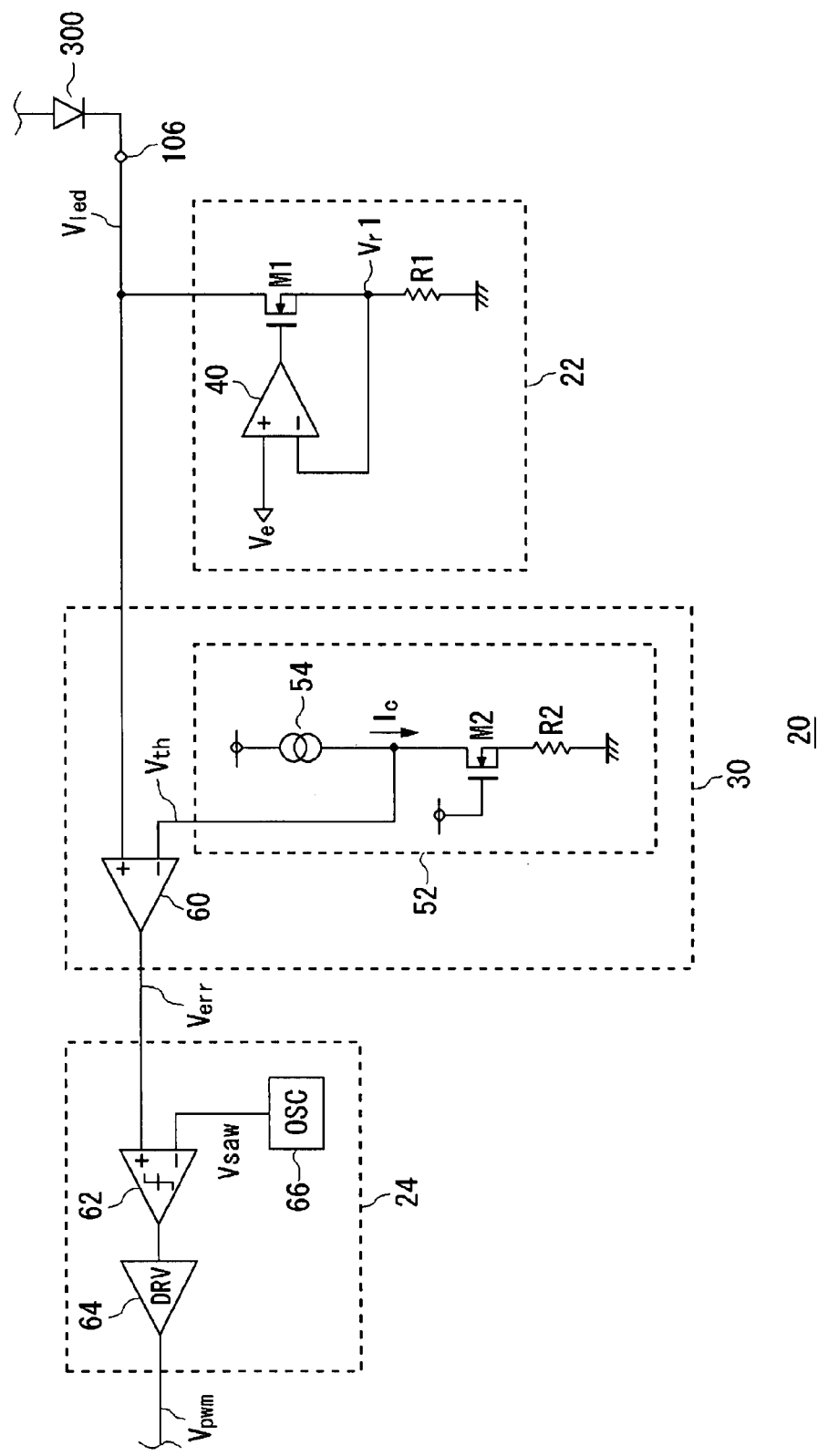
FIG. 11 is a circuit diagram showing a part of the construction of the driving circuit of FIG. 10.

FIG. 11 is a circuit diagram showing a part of the construction of the driving circuit 20 of FIG. 10. The construction of the constant current circuit 22 and the threshold voltage source 52 is the same as that of FIG. 3. In the driving circuit 20 of FIG. 11, the voltage Vled of the LED terminal 106 and the threshold voltage Vth output from the threshold voltage source 52 are input into an error amplifier 60. The error amplifier 60 amplifies the error between the voltage Vled and the threshold value Vth, and outputs it to the control unit 24 as an error voltage Verr.

On the basis of this error voltage Verr, the control unit 24 generates a switching signal Vpwm. The control unit 24 includes a voltage comparator 62, a driver 64, and an oscillator 66. The oscillator 66 outputs a periodic signal Vsaw having a triangular wave shape, and the voltage comparator 62 generates a signal that has been subjected to pulse width modulation by comparing this periodic signal Vsaw and the error voltage Verr. On the basis of the output of the voltage comparator 62, the driver 64 generates a switching signal for driving the switching regulator 70.

As a result of this, the output voltage Vout of the switching regulator 70 is adjusted so that the voltage Vled of the LED terminal 106 will be approximated to the threshold voltage Vth. Therefore, an unnecessarily high output voltage Vout is not generated while the constant current circuit 22 is being stably operated, so that a highly efficient operation can be realized.

Figure 12:
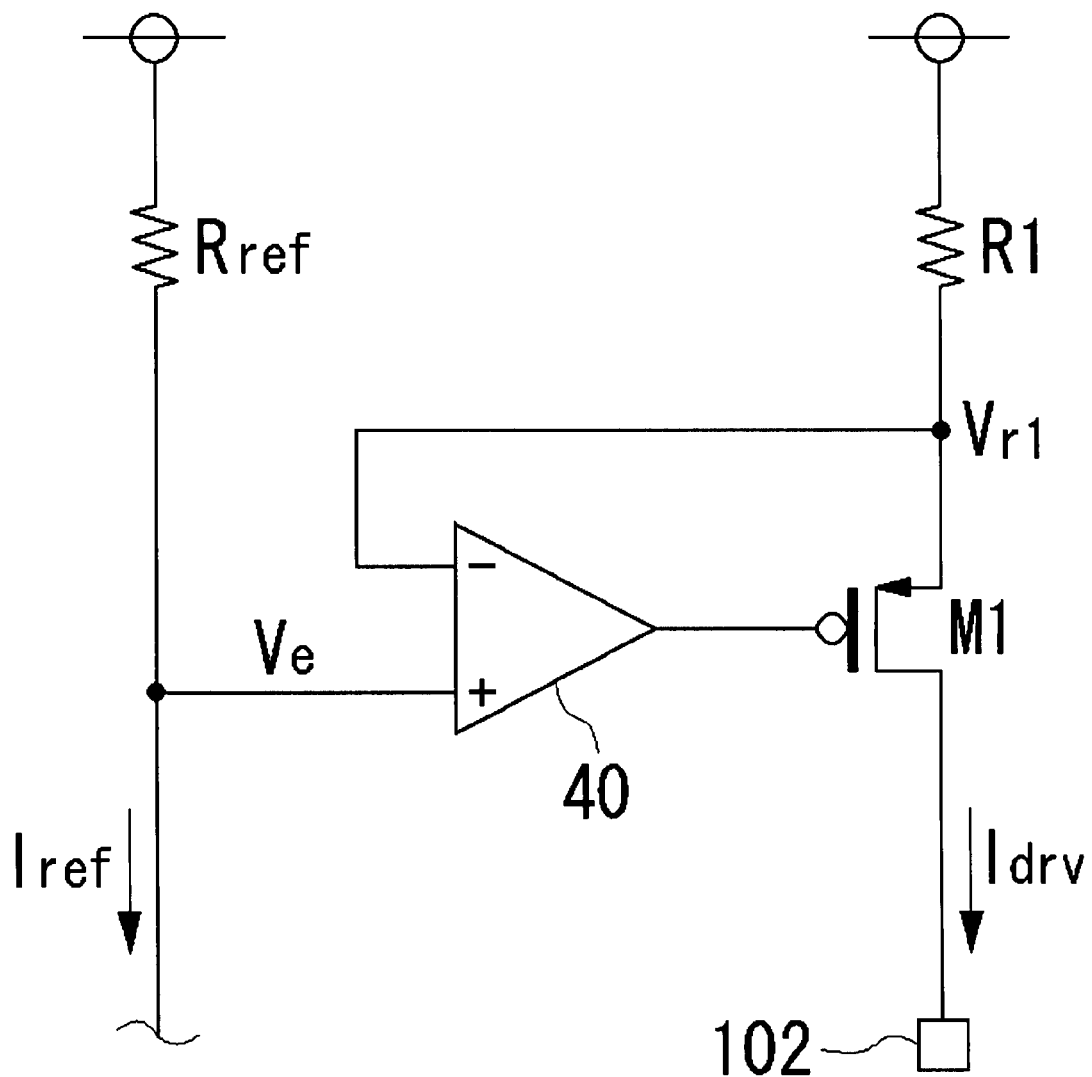
FIG. 12 is a view showing a modified example of the constant current circuit of FIG. 3.

FIG. 12 is a view showing a modified example of the constant current circuit 22. In the constant current circuit 22 of FIG. 12, the driving current Idrv is generated with the power supply voltage Vdd being a fixed voltage. The constant current circuit 22 of FIG. 12 includes a transistor M1, a first resistor R1, a reference resistor Rref, and an operation amplifier 40. A LED 300 to be driven is connected to the LED terminal 106. The reference resistor Rref is disposed on a path of the reference current Iref, and a predetermined fixed voltage Vdd is applied to one end of the reference resistor Rref. The voltage Ve appearing in the other end of the reference resistor Rref is applied to the non-inverting input terminal of the operation amplifier 40. The transistor M1 has a gate to which the output voltage of the operation amplifier 40 is applied and a source that is connected to the LED terminal 106. The first resistor R1 is connected to the source of the transistor M1, and the fixed voltage Vdd is applied to one end of the first resistor R1. The electric potential at the connection point between the transistor M1 and the first resistor R1 is fed back to the inverting input terminal of the operation amplifier 40. Even in the case in which the constant current circuit 22 is constructed in this manner, a driving current Idrv given by Idrv=Iref×Rref/R1 can be generated.

In the present embodiment, all of the elements constituting the power supply apparatus 100 and the light emitting apparatus 1000 may be integrated, or alternatively a part thereof may be constructed with discrete components, or a plurality of components may be made into a module as one package. Which part should be integrated may be determined according to the costs, the occupied area, and the like.

In the embodiment, description has been made on a case in which the LED is driven by the power supply apparatus 100. However, the load circuit is not limited to this, so that other light emitting elements such as an organic EL may be driven, and further a current-driven device other than a light emitting element can also be driven.

In the present embodiment, the transistor to be used is an FET; however, transistors of other types such as a bipolar transistor may be used, and the selection of these may be determined by the design specification demanded in the power supply apparatus, the semiconductor manufacturing process to be used, and the like.

While the preferred embodiments of the present invention have been described using specific terms, such description is for illustrative purposes only, and it is to be understood that changes and variations may be made without departing from the spirit or scope of the appended claims.

What is claimed is:

1. A power supply apparatus for performing constant current driving of a load circuit, comprising:
  a constant current circuit which is disposed on a path for driving the load circuit;
  a voltage generating circuit which outputs a driving voltage to the load circuit;
  a monitoring circuit which monitors a voltage across the two ends of the constant current circuit; and
  a control unit which controls the driving voltage that is output from the voltage generating circuit, wherein
  the monitoring circuit includes a threshold voltage source which generates a threshold voltage that follows the fluctuation of the voltage at which the constant current circuit can operate stably, and outputs to the control unit a result obtained by comparing the voltage across the two ends of the constant current circuit and the threshold voltage generated by the threshold voltage source, and
  the control unit controls the voltage generating circuit on the basis of the output of the monitoring circuit.

2. The power supply apparatus according to claim 1, wherein
  the voltage generating circuit is a charge pump circuit which switch among a plurality of boosting ratios, and
  the control unit switches a boosting ratio of the charge pump circuit on the basis of a result of voltage comparison of the monitoring circuit.

3. The power supply apparatus according to claim 1, wherein
  the voltage generating circuit is a switching regulator circuit, and
  the control unit controls a switching operation of the switching regulator circuit so that the voltage across the two ends of the constant current circuit and the threshold voltage will be equal to each other in the monitoring circuit.

4. The power supply apparatus according to claim 1, wherein
  the constant current circuit, the monitoring circuit, and the control unit are integrated on one semiconductor substrate.

5. The power supply apparatus according to claim 1, wherein
  the load circuit is a light emitting diode, and
  the constant current circuit is connected to a cathode terminal of the light emitting diode, and the monitoring circuit monitors the voltage at the cathode terminal of the light emitting diode.

6. A light emitting apparatus comprising:
  a light emitting diode, and
  a power supply apparatus according to claim 1 for performing constant current driving of the light emitting diode.

7. An electronic equipment comprising:
  a liquid crystal panel, and
  a light emitting apparatus according to claim 6 which is disposed as a back light of the liquid crystal panel.

8. The power supply apparatus according to claim 1, wherein
  the constant current circuit includes:
  a current output terminal to which the load circuit to be driven is connected;
  an operation amplifier having a first input terminal to which a predetermined reference voltage is applied;
  a first transistor having a control terminal to which an output voltage of the operation amplifier is applied and having one end connected to the current output terminal;
  a first resistor connected to the other end of the first transistor and having one end to which a predetermined fixed voltage is applied; and
  a feedback path which feeds the electric potential of the connection point of the first transistor and the first resistor back to a second input terminal of the operation amplifier, and
  the threshold voltage source includes:
  a constant current source which outputs a predetermined constant current;
  a second transistor which is disposed in series on a path of the constant current that is output from the constant current source; and
  a second resistor having one end to which the fixed voltage is applied and having the other end to which the second transistor is connected, and
  the constant current circuit outputs the voltage of the connection point of the second transistor and the constant current source as the threshold voltage.

9. The power supply apparatus according to claim 8, wherein the second transistor and the first transistor, and the second resistor and the first resistor are formed respectively by pairing on a semiconductor integrated circuit.

10. The power supply apparatus according to claim 8, wherein the constant current that is output from the constant current source is set within a range at which the second transistor operates in a constant current region.

11. The power supply apparatus according to claim 8, wherein the constant current circuit further includes a reference resistor disposed on a path of a reference current which accords with the constant current that is output from the constant current source and having one end to which the fixed voltage is applied, and the voltage appearing in the other end of the reference resistor is applied to the first input terminal of the operation amplifier as the reference voltage.

12. The power supply apparatus according to claim 11, wherein the reference resistor is formed by being paired with the first and second resistors on a semiconductor integrated circuit.

13. The power supply apparatus according to claim 8, wherein the monitoring circuit includes:

a voltage comparator which compares the voltage across the two ends of the constant current circuit and the threshold voltage generated by the threshold voltage source, and an offset voltage adjusting circuit which adjusts the offset voltage of the voltage comparator.

14. The power supply apparatus according to claim 13, wherein the offset voltage adjusting circuit adjusts a differential current of the voltage comparator.

15. The power supply apparatus according to claim 14, wherein the offset voltage adjusting circuit includes:

a main current source which generates a tail current to be supplied to a differential pair of the voltage comparator;

a first variable current source which generates a first variable current and changes one of the differential currents generated by the differential pair; and a second variable current source which generates a second variable current and changes the other of the differential currents generated by the differential pair.

* * * * *